March 24, 1970 E. O. P. TATTER ET AL 3,502,339

TONE ARM FOR A RECORD PLAYER

Filed June 27, 1968 3 Sheets-Sheet 1

Inventors:
Ernest O. P. Tatter
Philip Vazzano
By Hofgren, Wegner, Allen, Stellman & McCord
Att'ys

TONE ARM FOR A RECORD PLAYER

United States Patent Office 3,502,339
Patented Mar. 24, 1970

3,502,339

TONE ARM FOR A RECORD PLAYER

Ernest O. P. Tatter, Addison, and Philip Vazzano, Des Plaines, Ill., assignors to Warwick Electronics Inc., a corporation of Delaware Filed June 27, 1968, Ser. No. 740,528
Int. Cl. G11b *3/10*
U.S. Cl. 274—23 11 Claims

ABSTRACT OF THE DISCLOSURE

A tone arm assembly for a record player including a tone arm mounted on a support at the side of a turntable for pivotal movement about a first axis perpendicular to the turntable, a carrier member pivotally connected to the outer end of the tone arm and having a pickup including a stylus at one end thereof, and a control arm having one end mounted for pivotal movement about a second axis on the support that is parallel to the first axis, the opposite end of said control arm being pivotally connected to the end of said carrier member remote from said stylus. The control arm pivots the carrier member relative to the tone arm during playing of a record to maintain the longitudinal axis of the pickup tangent to the record groove as the stylus follows an arcuate path. The pivoting of the carrier member also functions to increase the effective lever arm of the tone arm to thereby gradually increase the tracking force. A spring is connected to the control arm for urging the stylus away from the center of a record to balance the force urging the tone arm inwardly and the spring approaches a dead center position as the stylus approaches the end of the playing area of a record, so that the balancing force of the spring gradually diminishes during record play.

BACKGROUND OF THE INVENTION

This invention relates in general to a tone arm for a record player, and more particularly to an improved tone arm structure which will allow the information recorded on a record to be more accurately and faithfully reproduced.

As is well known, the spiral groove of a record is formed by a cutter moving in a straight line path extending radially outward from the record center hole and at a constant right angle, with lateral undulations of the cutter forming corresponding information bearing undulations or modulations in the sides of the groove. These information bearing undulations are always directed along a radius of the record and thus are always perpendicular to the groove.

The stylus of a conventional tone arm is coupled to a cartridge means which converts the lateral movements of the stylus, along the cartridge's output sensitive axis, into electrical signals. Movement of the stylus along any line other than the output sensitive axis generally produces no output from the cartridge. The longitudinal axis of the cartridge passes through the point at which the stylus is coupled to the cartridge and is perpendicular to the output sensitive axis. In order to accurately reproduce the information from the modulated grove, the output-sensitive axis of the cartridge should always be maintained perpendicular to the groove so that all of the information recorded in the manner above described is detected without distortion. The perpendicular relationship of the longitudinal and output-sensitive axes implies the requirement that the longitudinal axis be maintained tangent to the record groove.

To reproduce the recorded information, a tone arm is conventionally pivotally mounted at a fixed location upon a support structure adjacent the side of a rotatably mounted turntable, and the weight of the tone arm wedges the stylus of a reproducing pickup assembly into the groove, with the electrical output of the reproducing pickup being proportional to the lateral displacement of the stylus by the modulated groove sides. With the above described conventional arrangement, it will be appreciated that the stylus moves through an arcuate path and thus the longitudinal axis of the pickup is not maintained tangent to the groove. The angular displacement of the axis of the pickup from a line tangent to the groove at the point of contact of the stylus is known as "tracking error" which not only results in the distortion of sound and generation of noise, but which also causes extreme wearing to the record and reproducing stylus. For a detailed explanation and analysis of "tracking error," reference should be made to the following articles: Bauer, B.B., "Tracking Angle in Phonograph Pickups," Electronics, March 1945 and Gicca, F. A., "Tone Arm Tracking Error in Stereo," Electronic World, October 1959.

Due to friction between the needle and the grove, there is a force upon the needle point in the direction of the line tangent to the groove at the point of contact. Because of the angle between the line tangent to the groove and the line between the stylus point and the pivot point of the tone arm, there is a component of this frictional force directed radially inwardly of the record which tends to pull the stylus towards the center of the record. This radially directed force often causes the stylus to jump over one or more convolutions of the spiral groove in a skating or skipping action. The magnitude of this radial force gradually decreases in conventional record players due to a gradual decrease in the angle which causes it.

Heretofore, many solutions have been proposed to obviate the tracking error and skating phenomena, but such solutions have been so complicated and impractical as to be commercially unacceptable.

SUMMARY OF THE INVENTION

The tone arm assembly of the present invention obviates the tracking error noted above by providing a unique arrangement wherein the pickup or cartridge is moved relative to the tone arm during the playing of a record so that the longitudinal axis of the cartridge is continuously tangent to the record groove. The skating problem mentioned above is obviated by providing a spring which urges the stylus away from the center of the record to balance the radially inwardly directed frictional force imposed upon the stylus. In an exemplary and preferred embodiment of the invention, the intermediate portion of a pickup carrier member is pivoted to the outer end of a tone arm, and the end of the carrier member remote from the stylus is pivotally connected to a control arm that extends generally parallel to the tone arm and which has its end opposite from the carrier member pivoted at a fixed location on a support. The tone arm, control arm and stylus carrier cooperate to form a constrained four bar linkage means which moves the stylus along an arcuate path across the grooved portion of a record in such a manner that the longitudinal axis of the pickup is always substantially tangent to the record groove. As the stylus proceeds across the grooved portion of a record, the linkage means also functions to increase the effective lever arm which determines the stylus tracking weight, which results in the tracking weight being gradually increased. A spring is connected to the control arm, and urges the stylus away from the center of the record, so as to balance the force imparted to the stylus by the aforesaid angular relation. The effective lever arm through which the spring acts decreases proportionately as the stylus moves across the grooved area of a record, so that the spring force diminishes as the stylus approaches the end of the grooved area.

DESCRIPTION OF THE PREFERRED EMBODIMENT

Figure 1:
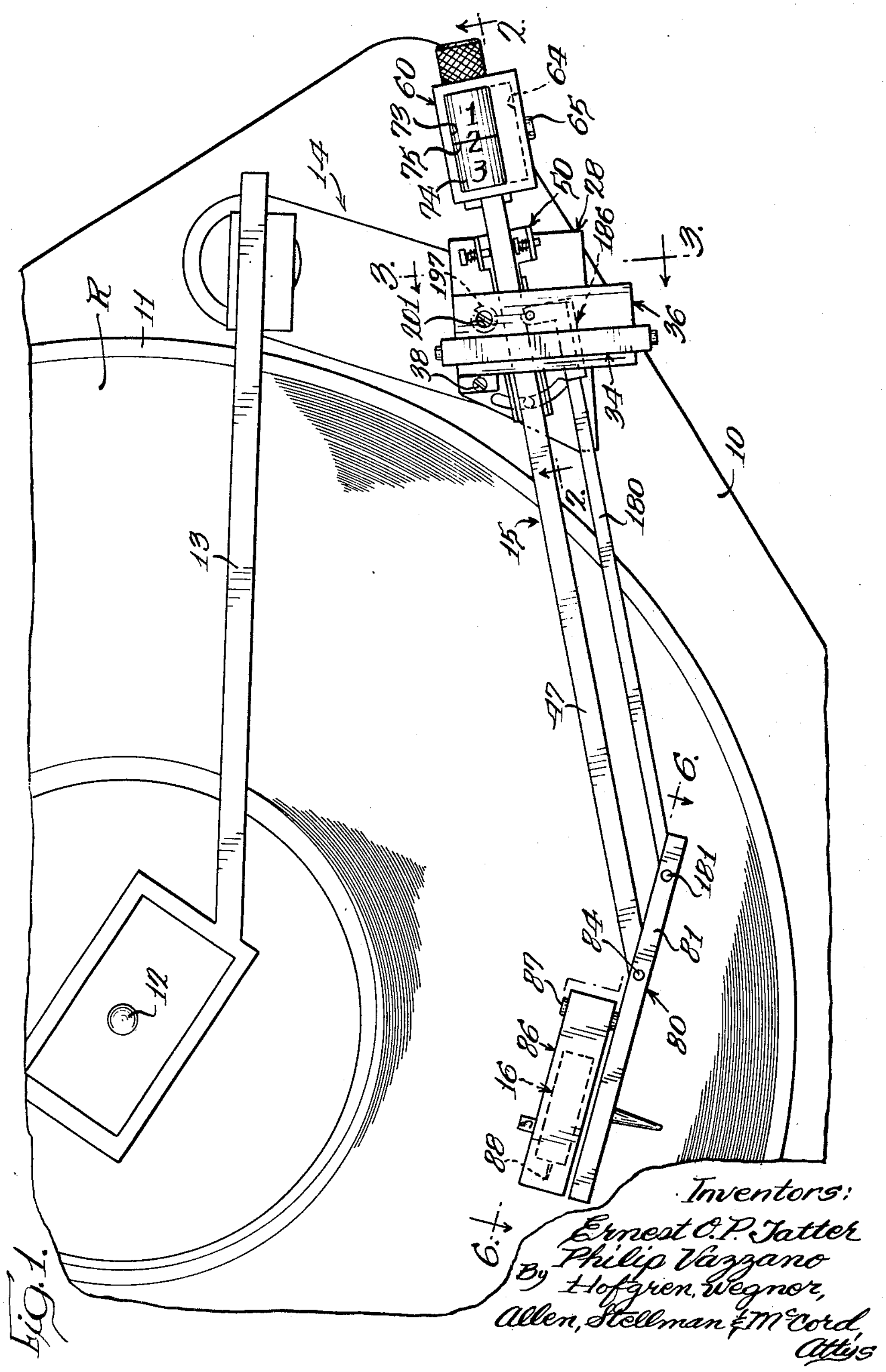
FIG. 1 is a fragmentary plan view of a record player including the tone arm structure of the present invention.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

Turning now to the drawings, the record changer with which the tone arm of the present invention is associated includes a support in the form of a motorboard 10 having a turntable 11 rotatably mounted thereon. The upper surface of the turntable 11 is adapted to support a record R thereon, and a spindle 12 is provided centrally of the turntable for centering records on the turntable and for supporting a stack of records thereabove. A pressure arm 13 is provided for stabilizing a stack of records on the spindle 12, and pressure arm 13 is mounted upon a suitable support structure 14 at the side of turntable 11 for movement between a record stabilizing position illustrated in FIG. 1, and a clearance position at the side of the turntable, not shown, enabling records to be placed upon and removed from spindle 12. A tone arm assembly 15 is mounted upon support 14 for swinging movement relative to motorboard 10 and turntable 11, and a pickup or cartridge assembly 16 is associated with the tone arm assembly 15 for tracking a record groove, as will hereinafter appear.

Mounting structure 14 includes a housing portion 17 screwed, or otherwise suitably secured, to motorboard 10; and housing portion 17 includes a vertical bore 18 having a vertical shaft 19 rotatably mounted therein. Shaft 19 has a central vertical bore 20, and a lift pin 21 is vertically movable within bore 20. The upper end 22 of shaft 19 is enlarged and rests upon the upper end of housing portion 17, and a forwardly facing notch 23 is provided in shaft end 22 for controlling the tone arm structure during a record change cycle, as will hereinafter appear. A pair of spaced ears 25 extend rearwardly from the upper end of housing portion 17, and ears 25 include aligned apertures 26 to define a first horizontal pivot axis. A pair of spaced support lugs 27, each having substantial arcuate extent, are provided on the upper surface of housing portion 17, and the upper surfaces of lugs 27 are coplanar to provide a support surface for a lift bracket 28.

Lift bracket 28 includes a pair of downwardly extending flange portions 29 which embrace the outer surfaces of ears 25 on housing 17, and openings 30 are provided in portions 29 in registry with the openings 26 in ears 25, with a transverse pin 31 extending through the aligned openings to mount the bracket 28 for pivotal movement relative to the housing 17. Bracket member 28 includes a transverse web portion 32, the planar undersurface of which normally seats upon the upper surfaces of lugs 27 to position the bracket 28 on the housing 17. A transverse groove 33 is provided in the upper surface of bracket 28 in alignment with the bore 20 in shaft 19, and an open rectangularly-shaped main mounting member 34 is fixed to bracket 28 as by having its lower wall portion press fit within groove 33. Additional fastening means may be provided to secure member 34 to bracket 28, as by having the illustrated pin **33*a* press fit into aligned openings in the lower portion of member 34 and web 32**.

Pivot screws 35 extend through internally threaded aligned openings in opposite sides of main mounting member 34, with the inner ends of screws 35 being smoothly polished and horizontally aligned to cooperate in forming a second horizontal axis. An open, generally rectangularly-shaped second mounting member 36 has outwardly facing openings in opposite sides thereof mounted upon screws 35, so that the member 36 is free to pivot relative to the member 34.

A tab 37 extends forwardly from the lower portion of member 36 at one corner thereon, and tab 37 includes an internally threaded hole through which an adjusting screw 38 is threaded to control set down position of the stylus.

The upper and lower wall portions of member 36 are provided with vertically aligned openings 40, and the end portions 41 of a pivot stud 42 are fixed in openings 40. Stud 42 includes portions 43 and 44 of enlarged diameter adjacent end portions 41, with portion 44 having greater axial extent than portion 43, and with portions 43 and 44 being spanned by a portion 45 of reduced diameter. Stud 42 provides a vertical axis about which the tone arm assembly 15 can pivot relative to the turntable 11.

Tone arm assembly 15 includes an elongate, rectangularly-shaped tubular main tone arm 47 having aligned openings 48 in the upper and lower walls thereof, which are impaled by the portion 45 of stud 42 to pivotally mount the tone arm assembly for movement relative to the turntable 11. It will be appreciated that either, or both, of enlarged stud portions 43 and 44 may be removably mounted on the stud 42, as by threading, to facilitate assembly of the main tone arm 47 to the stud 42. As is evident from FIG. 2, the upper wall of the main tone arm 47 butts against the undersurface of enlarged stud portioin 43, while a tone arm controlling bracket 50 is interposed between the lower wall of tone arm 47 and enlarged stud portion 44.

Bracket 50 includes a horizontally disposed stretch portion 51, the upper surface of which is positioned in face abutting engagement with the lower wall of main tone arm 47, and the lower portion of which is positioned in face abutting engagement with the upper surface of the enlarged portion 44 of stud 42. The forward portion of bracket 50 is somewhat U-shaped in end view, FIG. 3, and includes upright sides 52 confronting opposite sides of tone arm 47. The rearward end of bracket 50 includes upstanding ears 53 having holes therein, and a stud 54 (FIGS. 4 and 5) is loose in the opening in one ear 53 with its head adjacent one side of tone arm 47, while a screw 55 is threaded into the hole in the other ear 53 with its shank adjacent the other side of tone arm 47 to provide set down adjustment. Springs 56 and 57 are preferably interposed between the heads of stud 54 and screw 55, with the springs bearing against the respective ears 53. It will be appreciated that the head of stud 54 provides a following force against one side of tone arm 47, while the shank of screw 55 provides the adjustable abutment for the other side of tone arm 47, so that the position of the tone arm relative to the bracket 50 can be adjusted for set-down.

Figures 2, 4, 5:
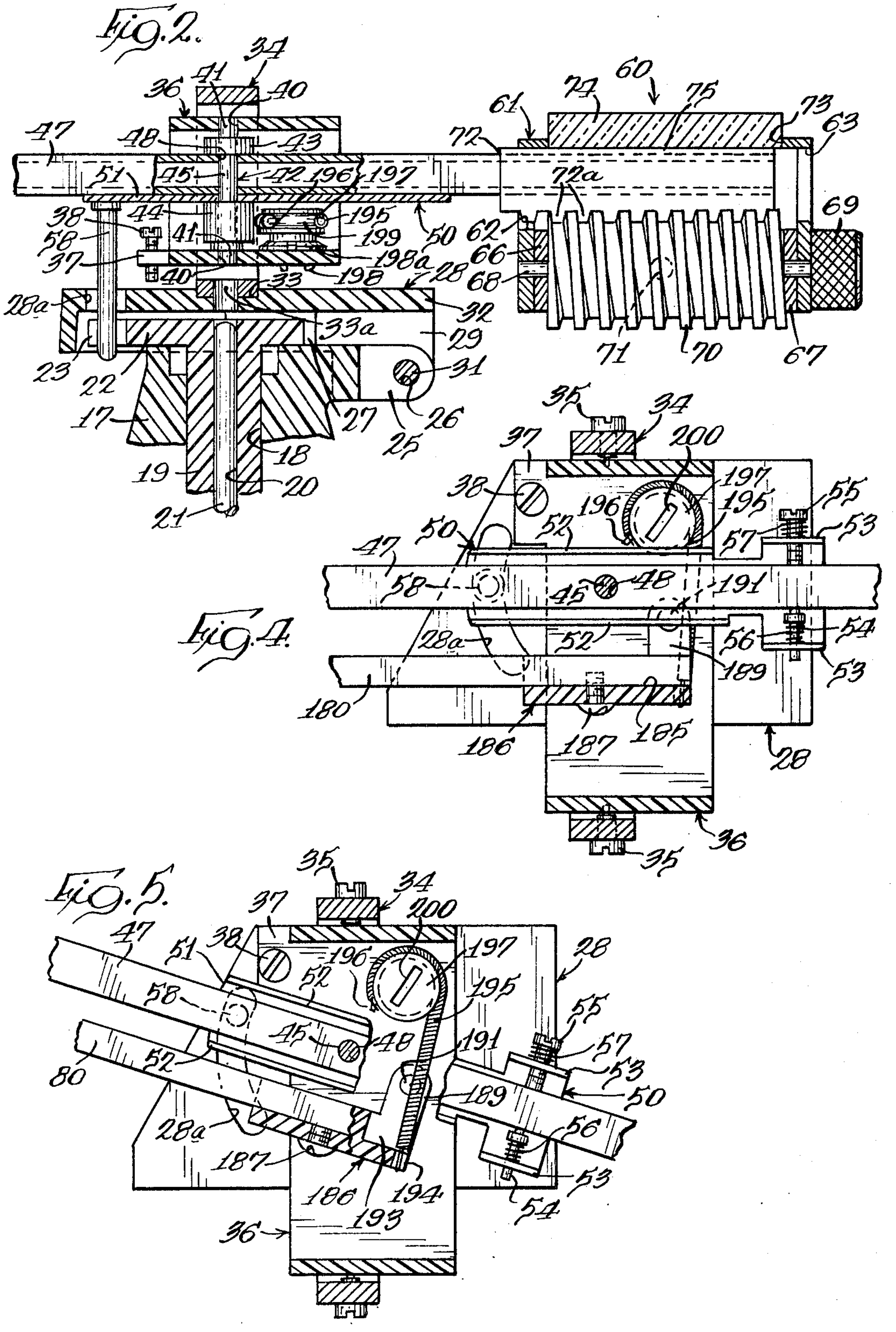
FIG. 2 is an enlarged sectional view taken generally along line 2—2 of FIG. 1, with certain portions broken away for clarity.
FIG. 4 is a sectional view taken generally along line 4—4 of FIG. 3.
FIG. 5 is a view similar to FIG. 4, with certain portions broken away for clarity and illustrating the tone arm position as the stylus approaches the end of the grooved area of a record.

As can be seen in FIGS. 2, 4 and 5, a pin 58 extends downwardly from the lower surface of the forward portion of bracket 50, and the pin 58 projects downward through and is captured in an arcuate opening 28*a* in member 28 into the forwardly open notch 23 in the upper end 22 of shaft 19. During playing of a record, as the tone arm sweeps across the turntable 11, pin 58 pivots shaft 19 relative to housing 17, and when a record change cycle is initiated by a suitable mechanism, not shown, after the playing of a record is completed, lift pin 21 moves vertically upwardly into engagement with the lower surface of the web portion 32 of member 28 to pivot the member 28 in a clockwise direction, as viewed in FIG. 2. A suitable structure, not shown, then pivots shaft 19 in a counterclockwise direction (FIG. 4), and the notch 23 engages the captured pin 58 to move the tone arm 47 to an out-of-the-way position at the side of the turntable 11, so that the lowermost record in the record stack upon spindle 12 can be ejected.

Adjustable counterweight means 60 (FIGS. 1 and 2) is provided at the rearward end of tone arm 47 to bias the tone arm assembly, including member 36, about the horizontal pivot axis formed by pivot screws 35. Counterweight assembly 60 includes a generally hollow housing 61 defining a weight block having rectangular openings 62 and 63 in the end walls thereof. A U-shaped bracket 64 (FIG. 1) is secured within housing 61 by a screw 65, and the legs 66 and 67 of bracket 64 are positioned in face abutting engagement with the inner surfaces of the end walls of housing 61. The end walls of the housing 61 and the bracket legs 66 and 67 include aligned openings, which rotatably receive the shank of a pin 68. Pin 68 includes an enlarged knurled head 69 outwardly of the rearmost wall of housing 61 for adjustment purposes, as will hereinafter appear. A worm screw 70 is fixed to pin 68, as by a set screw 71 (FIG. 2), and screw 70 is mounted for rotation between the legs 66 and 67 of bracket 64. The counter-weight assembly further includes a rack mounted upon tone arm 47 and having rack teeth 72*a* on the lower surface thereof which mesh with the teeth on worm screw 70. Rotation of the screw 70 results in adjustment of the weight along the tone arm. The upper surface of the tone arm 47 is provided with indicia at the rearward end thereof (FIG. 1) which are indicative of the stylus tracking force in grams, and the indicia are visible through an opening 73 in the upper wall of housing 61. A transparent magnifying insert 74 is preferably provided in opening 73, and a marker in the form of a line 75 is provided on the insert 74 for cooperative action with the indicia on the upper surface of the tone arm 47.

A pickup carrier 80 is pivoted to the outer end of tone arm 47, and pickup carrier 80 includes a hollow, generally rectangularly-shaped carrier member 81 having openings 82 and 83 (FIG. 6) in one side wall thereof. The outer end of tone arm 47 extends into carrier member 81 through opening 83, and a vertical pivot pin 84 impales the top and bottom walls of carrier member 81 and the top and bottom walls of the tone arm 47 to pivotally mount the carrier member 81 upon the tone arm 47. A suitable retaining ring 85 is preferably provided in an annular groove in the lower end of pin 84. Pickup assembly 16 is housed within a suitable mounting member 86 that is pivotally mounted to one side of carrier member 81 by a transversely extending pivot member 87. Pickup assembly 16 includes a conventional stylus 88 for tracking a record groove, and a retractor member 89 is preferably associated with the mounting member 86 for lifting the stylus out of engagement with a record, when a downward force is applied to the tone arm.

Figures 3, 6, 7:
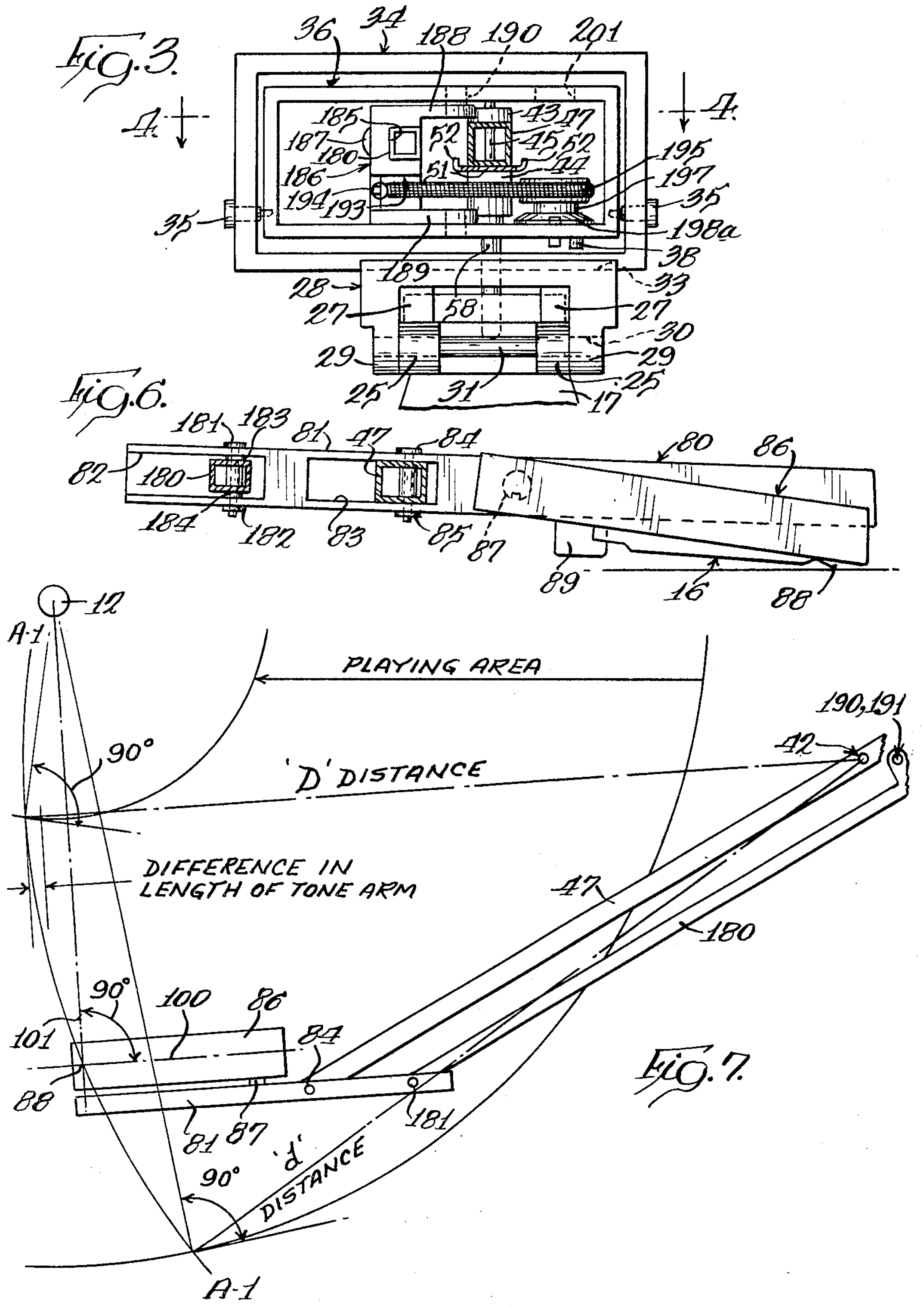
FIG. 3 is an enlarged sectional view taken generally along line 3—3 of FIG. 1.
FIG. 6 is an enlarged sectional view taken generally along line 6—6 of FIG. 1.
FIG. 7 is a fragmentary plan view schematically illustrating the tone arm structure in several positions.

Means is provided for controlling the angular relationship of carrier member 81 and pickup assembly 16 relative to tone arm 47 as the stylus 88 tracks across the playing area of a record, and this means includes an elongate control arm 180 for retaining the longitudinal axis of pickup assembly 16 tangent to the record groove as the stylus proceeds across a record. Control arm 180 is a hollow rectangular member (FIG. 6) and the outermost end of control arm 180 extends through opening 82 into the interior of carrier member 81. A vertical pin 181 impales aligned openings in the top and bottom walls of carrier member 81 and in the top and bottom walls of control arm 180 to mount the carrier member 81 for pivotal movement relative to the control arm 180. A retaining ring 182 is preferably provided in an annular groove in the lower end of pin 181, and suitable spacers 183 and 184 may be interposed between the top and bottom surfaces of the carrier member and control arm, as is illustrated in FIG. 6. The rearward end of control arm 180 is slidably received in the transversely open notch 185 of a pivotally mounted hinge member 186. A screw 187 extends through an opening in the side wall of hinge member 186, and is threaded into an internally threaded hole in one side of control arm 180 to secure the control arm to the hinge member 186. A pair of vertically spaced, laterally extending flanges 188 and 189 are provided on hinge member 186, and flanges 188 and 189 each have vertically aligned openings therein that are impaled by respective pivot pins 190 and 191. Pivot pins 190 and 191 are fixedly received in aligned openings in the top and bottom walls, respectively, of member 36 and define a second vertical axis spaced from and parallel with the pivot axis provided by stud 42.

The manner in which the above described structure obviates the "tracking error" problem will be best understood from FIG. 7. As is evident from FIG. 7, control arm 180 is parallel to tone arm 47, and with pivots 42 and 190, 191 fixed, the tone arm, control arm and carrier member 81 cooperate to form a four bar constrained linkage for controlling the movement of the stylus 88 relative to the groove in the record being played. As is evident from FIG. 7, when the stylus is in the outermost groove of a record, the longitudinal axis 100 of the pickup or cartridge assembly 16 is tangent to the outermost record groove. As the stylus 88 begins to proceed across the grooved area of the record, the control arm 180 collapses toward tone arm 47 to pivot the carrier member 81 in a counterclockwise direction about pivot 84 to thereby gradually move the stylus 88 outwardly. It will be appreciated that once the position of the counterweight assembly 60 has been selected, the tracking weight of stylus 88 is a function of its distance from the horizontal axis defined by pivot screws 35. Thus, as the stylus 88 gradually moves outwardly when the tone arm 47 proceeds across the playing area of a record, the effective pivot distance between stylus 88 and the horizontal pivot axis defined by screws 35 increases, whereby the tracking force of stylus 88 gradually increases. Furthermore, the ratio of length between control arm 180 and tone arm 47 is selected so that as the stylus 88 proceeds across the playing area of a record, the carrier member 81 is pivoted by the control arm 180 to an extent that the longitudinal axis 100 of the pickup assembly 16 continues to be tangent to the record groove to thereby substantially eliminate "tracking error." The increasing tracking weight experienced as the stylus moves across the grooved areas of a record effectively enhances tracking ability, particularly at the innermost grooved portion of a record wherein the modulation pattern is more dense or more linearly compressed than at the outer grooves. As is evident from FIG. 7, the stylus 88 moves along a continuously curved path A–1, at each point which the output-sensitive axis 101 of pickup assembly 16 coincides with a radius of the record or in other words, is prepedicular to the record groove. The projected locus of the stylus path inwardly of the grooved portion of the record is on an opposite side of spindle 12 from pivot stud 42, as is evident from FIG. 7. The effective increase in the moment arm for stylus 88 is also evident from FIG. 7, wherein the initial moment arm length is represented by reference numeral *d*, while the final effective moment arm is represented by the reference numeral D.

As is well-known, the tone arm 47 is moved relative to the turntable 11 by the engagement of a record groove with the stylus. During record movement, forces are created tending to move the tone arm inwardly due to the angle between the line passing through the tone arm pivot and the point of stylus contact and a line tangent to the groove at the point of stylus contact, with the result that the force tends to urge the stylus 88 radially inwardly. The magnitude of the radially inwardly directed force upon stylus 88 gradually decreases as the stylus 88 moves across the record playing area, in view of the fact that the angle decreases as the stylus progresses across the record. The present invention includes balancing means for counteracting the inwardly directed force, and this means will be best understood from FIGS. 4 and 5.

With reference to FIG. 5, it will be noted that the rearward end of hinge member 186 is provided with an open clearance area 193, with the side wall of the hinge member 186 being provided with a spring seat in the form of a hook 194. A coil spring 195 has one end connected to hook 194, with the opposite end of spring 195 being connected to a second spring seat in the form of a lug 196 extending radially outwardly from a tension adjusting stud 197. Stud 197 is mounted by a pair of resilient lugs 198 that extend downwardly through an opening in member 36, with the lugs 198 being yieldably urged outwardly into engagement with the sides of the hole in member 36. A spring washer **198*a* functions as a friction brake to hold the stud in rotatably adjusted position. Spring 195 is positioned in an annular recess 199 at the upper end of adjusting stud 197, and the position of the stud 197 (and thereby the tension in spring 195) can be adjusted by means of a slot 200 in the upper end of stud 197. Slot 200 is accessible through a hole 201 (FIG. 1) in member 36**.

As is evident from FIG. 4, spring 195 biases hinge member 186 in a counterclockwise direction about pivot 190, 191, and this force is transmitted through control arm 180 to pivot pin 181, which urges carrier member 81 in a counterclockwise direction about pivot 84 to urge the stylus 88 radially outwardly of a record being played. The magnitude of spring 195 is adjusted such that the stylus will be urged toward the outermost side of a record groove with a force sufficient to compensate for, and to off-set the radially inwardly acting forces referred to. This balancing force will retain the stylus 88 effectively centrally within a record groove, so as to obviate a skating or skipping tendency. As is evident by comparing FIGS. 4 and 5, as the stylus moves across the grooved portion of a record, the lever arm through which spring 195 acts gradually decreases, and spring 195 moves to a position substantially in alignment with pivot 190, 191 when the stylus approaches the end of the grooved record portion, so that the effective balancing force gradually decreases as the stylus tracks across a record. It will be understood that the decrease in balancing force is proportionate to the decrease in "skating" force as the lever arm gradually decreases, so that the stylus will remain properly centered within the record groove as it proceeds across the entire playing area.

We claim:

1. A record player comprising: a support; a turntable mounted for rotation relative to said support and adapted to carry a record having a spiral groove; a spindle extending upwardly centrally of said turntable; a tone arm; means mounting said tone arm on said support at one side of said turntable for a movement about a first axis perpendicular to the turntable, and a second axis parallel to the turntable; pickup means including a stylus and having a longitudinal axis, said pickup means being carried by said tone arm and adapted to track the spiral groove of a record on the turntable, and control means for moving said pickup means along a curved path such that said longitudinal axis is always substantially tangent to the record groove and for increasing the distance between said second axis and said stylus as said pickup means moves toward the center of the record whereby the tracking force of said pickup means against said record is gradually increased.

2. A record player as set forth in claim 1 including a pickup carrier pivotally mounted on the tone arm, said control means including a control arm pivotally mounted at one end at a fixed location and pivotally connected at the other end to said pickup carrier at a location offset from the pivotal connection of said pickup carrier to said tone arm.

3. A record player as set forth in claim 2 wherein said tone arm and said control arm are generally parallel throughout their length.

4. A record player as set forth in claim 1 wherein said control means is arranged so that the projected locus of the stylus path beyond the grooved portion of the record extends on an opposite side of said spindle from said second axis.

5. A record player as set forth in claim 1 including means for urging said stylus generally away from the center of a record, said urging means being arranged so that the force thereof diminishes as the stylus approaches the end of the grooved area of a record, whereby the radially inwardly directed frictional force on the stylus is effectively cancelled.

6. A record player as set forth in claim 2 including spring means connected to said control arm for urging said stylus generally away from the center of a record, said spring means being arranged so that the force thereof diminishes as the stylus approaches the end of the grooved area of a record, whereby the radially inwardly directed frictional force on the stylus is effectively cancelled.

7. A record player as set forth in claim 6 wherein said spring means is defined by a spring having one end fixed and the opposite end connected to said control arm one end, said spring being arranged to approach the pivotal mounting of said control arm one end as said stylus approaches the end of the grooved end of a record.

8. A record player as set forth in claim 7 including means for adjusting the biasing force of said spring.

9. For use in a record player including a support, a turntable rotatably mounted on said support, a spindle extending upwardly centrally of said turntable, and mounting structure on said support at one side of said turntable defining a first and second axes perpendicular to said turntable, a tone arm assembly comprising: a tone arm mounted for pivotal movement about said first axis; a carrier member having an intermediate portion pivotally connected adjacent the outer end of said tone arm; a pickup means having an output-sensitive axis and a stylus, said pickup means being mounted on said carrier member with said stylus being located toward one end of said carrier member; and a control arm mounted for pivotal movement about said second axis, said control arm being pivotally connected to said carrier member at the end remote from said stylus, said tone arm, control arm and carrier members being so proportioned as to maintain said output-sensitive axis perpendicular to the record groove as said stylus follows an arcuate path during the playing of a record.

10. A tone arm assembly as set forth in caim 9 including spring means for urging said stylus away from the center of a record to balance the drag forces of the opposite sides of a record groove against the stylus, said spring means being arranged so that the force thereof diminishes as said stylus approaches the end of the grooved portion of a record.

11. A tone arm as set forth in claim 10 wherein said spring means is defined by a spring having one end connected to said mounting structure and the other end connected to the end of said control arm remote from said carrier member, said spring being positioned in substantial alignment with said second axis when said stylus approaches the end of the grooved portion of a record, whereby the force of said spring means is effectively negated.

References Cited

UNITED STATES PATENTS

| | | | |
|---|---|---|---|
| 2,983,517 | 5/1961 | Klein. | |
| 3,232,625 | 2/1966 | Vaneps | 274—23 |
| 3,088,742 | 5/1963 | Alexandrovich | 274—23 |
| 3,051,493 | 8/1962 | Dreier | 274—23 |
| 2,522,997 | 9/1950 | Coppleman | 274—23 |

FOREIGN PATENTS

| | | |
|---|---|---|
| 3,704 | 8/1931 | Australia. |
| 386,851 | 1/1933 | Great Britain. |

LEONARD FORMAN, Primary Examiner

D. A. DEERING, Assistant Examiner